United States Patent [19]

Morishita et al.

[11] 3,953,360

[45] Apr. 27, 1976

[54] PREPARATION OF SELECTIVE ADSORBING PARTICLES

[75] Inventors: Masataka Morishita; Mitsuru Fukushima; Yoshihito Inaba, all of Shizuoka, Japan

[73] Assignee: Toyo Jozo Company, Ltd., Japan

[22] Filed: Mar. 19, 1974

[21] Appl. No.: 452,530

[30] Foreign Application Priority Data

Mar. 19, 1973 Japan................................ 48-32048

[52] U.S. Cl................................. 252/428; 210/39; 210/40; 260/240 R; 424/124
[51] Int. Cl.$^2$.......................................... B01J 31/06
[58] Field of Search............... 252/428; 117/DIG. 11

[56] References Cited
UNITED STATES PATENTS

| | | | |
|---|---|---|---|
| 2,281,194 | 4/1942 | Holmes et al................... | 252/428 X |
| 2,933,455 | 4/1960 | Doying.............................. | 252/428 |
| 3,442,819 | 5/1969 | Herbert............................. | 252/428 |

FOREIGN PATENTS OR APPLICATIONS 21,002    6/1971    Japan.................................. 252/428

*Primary Examiner*—Patrick P. Garvin
*Attorney, Agent, or Firm*—Craig & Antonelli

[57] ABSTRACT

Selective adsorbing particles are prepared by dispersing activated charcoal in a hydrophilic solvent solution of a polymer capable of forming a semi-permeable film in a coagulating medium and then adding the dispersion dropwise into a coagulating bath. The selective adsorbing particles have adsorption capacity substantially the same as that of untreated activated charcoal. Separation of organic compounds is performed by a method wherein a solution containing a mixture of adsorptive organic compounds and non-adsorptive compounds is contacted with the selective adsorbing particles. The method is suitable for separation or purification of various organic compounds such as antibiotics, dyestuffs, nucleic acids, preteins or enzymes.

7 Claims, No Drawings

PREPARATION OF SELECTIVE ADSORBING PARTICLES

This invention relates to preparation of selective adsorbing particles and a method for separation of organic compounds by using same.

Activated charcoal has been known as excellent adsorbent which can adsorb organic compounds having a molecular weight from some 10 to some 100,000. Its adsorption capacity is useful in wide fields such as food industries or chemical industries for the purpose of decoloration, deodorization, removal of trace components or recovery. However, because activated charcoal is in state of fine powders, it is very inconvenient in handling. Recently, to improve this drawback, there have been proposed activated charcoal granules which are prepared by blending activated charcoal and polymers under pressurized conditions and treating thermally the blend at high temperature. These activated carbon granules are so high in density that adsorption sites of activated charcoal are hindered by other activated charcoal or carbonized polymers. Hence, they are extremely inferior in adsorption capacity as compared with untreated activated charcoal. There have also been reported that molecular sieving effect can be imparted to activated charcoal by such methods as the method wherein Saran or polyvinylidene chloride resin is pyrolyzed; the method wherein activated charcoal and polymers are blended under pressure and then carbonized; the method wherein Saran carbon or activated charcoal is subjected to heat treatment at high temperature to reduce pore sizes thereof; or the method wherein fine coal powders are activated uniformly under severe conditions to enlarge pore sizes thereof. However, activated charcoals obtained by these methods have molecular sieving effect in the range of molecular weight of about 150, i.e. low molecular weight compounds with a molecular length from 4 to 6 angstroms. They can therefore be available only for separation of gaseous components in petroleum chemistry. Furthermore, as to sharpness in molecular sieving effect, no distinct molecular sieving can be achieved by these activated charcoals. Therefore, they cannot be utilized for separation or purification of various organic compounds such as antibiotics, dyestuffs, nucleic acids, proteins or enzymes.

An object of the present invention is to provide a novel selective adsorbing particle having adsorption capacity which is substantially the same as that of untreated activated charcoal and having a selective adsorbing effect.

Another object of the present invention is to provide a process for preparing the aforesaid selective adsorbing particle which comprises dispersing activated charcoal in a hydrphilic solvent solution of a polymer capable of forming a semi-permeable film in coagulating medium and then adding the dispersion dropwise into a coagulating bath.

The other object of the present invention is to provide a method for separation of organic compounds, which comprises contacting a mixture of adsorptive organic compounds and non-adsorptive compounds with the aforesaid selective adsorbing particles.

The coagulating medium to be used in the present invention is not limited, so long as it can remove a hydrophilic solvent in admixture therewith from a solution of said solvent containing a polymer and activated charcoal. Said coagulating medium preferably contains no component adsorbable by activated charcoal as far as possible. Examples of the coagulating medium are water, aqueous salt solutions, aqueous surfactant solutions, aqueous hydrophilic protective colloid solutions, ethylene glycol or a mixture thereof with water, propylene glycol or a mixture thereof and the like. In particular, inexpensive aqueous medium such as water or aqueous salt solutions are preferably used. When a medium such as ethylene glycol is used, it is preferably used in a mixture with water. Aqueous salt solutions include aqueous sodium chloride solution, aqueous sodium phosphate solution, aqueous sodium sulfate solution, acetate buffer solution, phosphate buffer solution and the like of a concentration of 10% or less. As aqueous surfactant solutions, there may be used aqueous solutions containing 0.01 to 5%, preferably 0.25 to 2%, of anionic surfactants, for example, alkylbenzene sulfonates such as Newlex R, Newlex C-1, Newlex paste H, alkylester sulfonates such as Lapizol B and sodium sulfates of higher alcohols such as Syntolex. As hydrophilic protective colloid solutions, there may be used an aqueous solution containing 0.05 to 5%, preferably 1 to 2%, of sodium carboxymethyl cellulose, hydroxypropyl cellulose, methyl cellulose, hydroxypropylmethyl cellulose or polyvinyl alcohol. These surfactants and hydrophilic protective colloids may also be used in combination. Furthermore, for improvement of the particle shapes of the selective adsorbing particles to be obtained, a hydrophilic solvent such as acetone or methyl alcohol may be added in an amount of 5% or less.

As the hydrophilic solvent to be used in the present invention, any solvent may suitably be selected, so long as it can dissolve the polymer employed, although solubility differs depending on said polymer, is miscible with the coagulating medium, and, preferably, does not deteriorate the adsorption capacity of activated charcoal. Typical examples are N,N-dimethylformamide (DMF), dimethylsulfoxide (DMSO), N,N-dimethylacetamide, acetone, methyl ethyl ketone, methanol, ethanol and isopropanol. These solvents may be used alone or in mixtures.

As the polymer to be used in the present invention, there may be used any polymer which is insoluble in the coagulating medium, capable of forming semi-permeable film in the coagulating medium and does not lower the adsorption capacity of activated charcoal. Examples are cellulose derivatives such as ethyl cellulose, cellulose acetate, cellulose acetate phthalate, nitro-cellulose, or hydroxypropylmethyl cellulose phthalate, polyvinyl derivatives such as polyvinyl chloride, polyvinyl formal, polyvinyl butyral, vinyl chloride-vinyl acetate copolymer, or vinyl chloride-vinyl propionate copolymer polyacrylonitrile, polymethacrylonitrile, polyacrylic acid derivatives such as polydimethylaminoethyl methacrylate, polystyrenes and polyesters. In order to obtain selective adsorbing particles excellent in water permeability and strength, cellulose acetate, polyvinyl butyral, polyvinyl formal, polyacrylonitrile, vinyl chloride-vinyl acetate copolymer and vinyl chloride-vinyl propionate are preferably used. Two or more kinds of polymers may also be used together.

For preparation of the selective adsorbing particles according to the present invention, a polymer capable of forming semi-permeable film in a coagulating medium is first dissolved in a hydrophilic solvent. If the concentration of the polymer is too low, although the critical range differs depending on the coagulating medium and the polymer to be employed, the polymer solution is dissipated in the coagulating medium when it is added dropwise thereinto to make formation of selective adsorbing particles difficult. Hence, the polymer concentration is generally preferred to be about 5% or more. On the contrary, if the concentration of the polymer is too high, dropwise addition of the polymer solution into the coagulating medium is difficult and bad influences are caused on water permeability of the selective adsorbing particles obtained. The upper limit of the concentration of the polymer is therefore about 30%.

The activated charcoal powders are then dispersed into the hydrophilic solvent solution containing the polymer. If the activated charcoal powders used contains moisture, there may be caused precipitation of the polymer. Therefore, before use, activated charcoal powders are preferably dried as far as possible or moisture is removed by washing the activated charcoal powders with an organic solvent which does not cause precipitation of the polymer and is miscible with the hydrophilic solvent. The proportion of the activated charcoal powders used is about 20% or more, preferably about 40 to 80% by weight based on the dry weight of the selective adsorbing particles to be obtained. If the viscosity of the polymer solution is so high as to make homogeneous dispersion of the activated charcoal difficult, activated charcoal may be dispersed into the hydrophilic solvent before the polymer is dissolved therein. Furthermore, for the purpose of varying the range of selective adsorbing effect of the selective adsorbing particles, and improving wettability of the selective adsorbing particle with water, a water soluble substance may be used as the third component, if desired.

The dispersion is subsequently added dropwise in a coagulating medium to coat the activated charcoal with the polymer in shapes of particles. The particle size can freely be controlled by varying the size of droplets in this dropwise addition. For formation of minute particles, spraying through a nozzle or other conventional means may conveniently be used. The coagulating medium is used in an amount sufficient to precipitate the polymer by removing the hydrophilic solvent in admixture therewith. In general, it is used in amounts of about 10-fold or more volume of the hydrophilic solvent. It may also be used in further increased amounts.

The thus precipitated selective adsorbing particles containing a large amount of coagulating medium are then collected, washed and, if desired, dried.

The selective adsorbing particles obtained according to the process of the present invention have sizes in the range from 100 to 5000 microns in outer diameter. The selective adsorbing particles have a specific structure such that there is a continuous-phase solid organic film forming polymer consisting of an outer permeable barrier layer from about 0.5 to 5 microns in thickness having a plurality of micropores from 10 to 50 angstroms in diameter and a macroporous ladder polymer gel matrix continuous to said barrier layer, and activated charcoal is dispersed inner side of said ladder polymer gel, and have a void volume equal to at least 25% of the total volume thereof.

As mentioned above, according to the present invention, there is also provided a method for separation of organic compounds by the use of the selective adsorbing particles as described above. A substrate containing a mixture of adsorptive organic compounds and non-adsorptive organic compounds is treated by passing through the selective adsorbing particles which are, for example, packed in a column. Examples of the mixture of organic compounds are a solution containing dyestuffs, a solution containing proteins or enzymes and a solution containing antibiotics. Alternatively, the selective adsorbing particles may directly be added in a vessel containing said substrate, followed by solid-fluid separation in a conventional manner. Then, depending on the object of separation, fluid layer or selective adsorbing particles are collected by conventional methods. Further, useful organic compounds are collected from the fluid layer or, if desired, useful organic compounds are collected by elution from the selective adsorbing particles.

The term "adsorptive organic compound" used here in the specification and claims refers to an organic compound which can be adsorbed by the selective adsorbing particles of the present invention in an effective amount. The effective amount is not absolute but relative with the value of the organic compound and the object of separation. For example, effective amount is defined with reference to the amount of adsorption which is required to fulfill the object of separation or purification of organic compounds contained in a solution of with reference to the amount obtained when adsorbed organic compounds are eluted, if said a mount is yet valuable.

If the adsorptive organic compounds are defined as the organic compounds having adsorption degree of about 50% or more, the adsorptive organic compounds for the selective adsorbing particles as obtained in Examples 1 through 4 refer to the organic compounds having a molecular weight of about 37000 or less. On the other hand, if the non-adsorptive organic compounds are defined as the organic compounds having adsorption degree of about 10% or less, the non-adsorptive organic compounds for these Examples refer to the organic compounds having a molecular weight of 42000 or more. According to the similar definitions, the adsorptive organic compounds for the selective adsorbing particle as obtained in Example 5 have a molecular weight of about 28000 or less and non-adsorptive organic compounds a molecular weight of 32000 or more; the adsorptive organic compounds for the selective adsorbing particle as obtained in Example 6 have a molecular weight of about 26000 or less and non-adsorptive organic compounds a molecular weight of 29000 or more.

EXAMPLE 1

Twenty grams of cellulose acetate are dissolved in 200 ml of dimethyl sulfoxide and 20 g of activated charcoal (Kyoryoku Shirasagi: trade name; Takeda Chemical Industries Co.) are dispersed into this solution. The dispersion is then added dropwise through a capillary of about 1 mm in diameter into 20 liter of water. After the mixture is stirred for a while, the resulting activated charcoal coated with cellulose acetate is separated by filtration to obtain 224 g of water containing selective adsorbing particles (particle size: 1 to 3 mm).

EXAMPLE 2

Twenty grams of polyacrylonitrile are dissolved in 200 ml of dimethyl sulfoxide and 40 g of the same activated charcoal as used in Example 1 are dispersed into this solution. The dispersion is then added dropwise through a capillary of 1 mm in diameter into 12 liter of water. After the mixture is stirred for a while, the resulting activated charcoal coated with polyacrylonitrile is separated by filtration to obtain 230 g of water containing selective adsorbing particles.

EXAMPLE 3

Twenty grams of polyvinyl butyral are dissolved in 200 ml of dimethylformamide and 30 g of the same activated charcoal as used in Example 1 are dispersed into this solution. The dispersion is then added dropwise through a capillary of 1 mm in diameter into 20 liter of water. After the mixture is stirred for a while, activated charcoal coated with polyvinyl butyral is separated by filtration to obtain 226 g of water containing selective adsorbing particles.

EXAMPLE 4

Thirty grams of vinyl chloride-vinyl acetate copolymer are dissolved in 200 ml of dimethylformamide and 30 g of the same activated charcoal as used in Example 1 is dispersed into this solution. The dispersion is then added dropwise through a capillary of 1 mm in diameter into 20 liter of water. After the mixture is stirred for a while, the resulting activated charcoal coated with vinyl chloride-vinyl acetate copolymer is separated by filtration to obtain 246 g of water containing selective adsorbing particles.

EXAMPLE 5

Twenty grams of cellulose acetate are dissolved in 200 ml of dimethylsulfoxide and 20 g of the same activated charcoal as used in Example 1 are dispersed into this solution. In this dispersion is further dissolved 30 ml of Desfoam CD 221 (trade name; Nihon Yushi Co.). The solution obtained is added dropwise through a capillary of 1 mm in diameter into 12 liter of 1% aqueous hydroxypropyl cellulose. After the mixture is stirred for a while, activated charcoal coated with cellulose acetate is separated by filtration, followed by thorough rinsing with water, to obtain 214 g of water containing selective adsorbing particles.

EXAMPLE 6

Twenty grams of cellulose acetate are dissolved in 200 ml of dimethylsulfoxide and 20 g of the same activated charcoal as used in Example 1 are dispersed into this solution. Then, 30 ml of Adekatol 45-S8 (trade name; Asahi Denka Co.) is dissolved in the thus prepared dispersion. The solution obtained is added dropwise through a capillary of 1 mm in diameter into 20 liter of ethylene glycol-water mixture (2:1), followed by the subsequent procedure as described in Example 1, to obtain 238 g of water containing selective adsorbing particles coated with cellulose acetate.

EXAMPLE 7

Twenty grams of cellulose acetate are dissolved in 200 ml of dimethylsulfoxide and 20 g of the same activated charcoal as used in Example 1 are dispersed into this solution. The dispersion is then added dropwise through a capillary of 1 mm in diameter into 10 liter of 0.1 M phosphate buffer solution, followed by the subsequent procedure as described in Example 1, to obtain 237 g of water containing selective adsorbing particles coated with cellulose acetate.

EXAMPLE 8

110 Grams of the selective adsorbing particles obtained in Example 1 are packed in a column (2.5 × 35 cm). Through this column is passed 200 ml of protease culture broth filtrate as obtained in Example 13 at a flowing velocity of 1 ml/minute. After the said column is washed sufficiently with water, elution is performed with 600 ml of 0.1 N aqueous sodium hydroxide solution and further with 400 ml of 1 N aqueous sodium hydroxide solution, respectively, to obtain natural dyestuffs having the following hues.

Eluate with 0.1 N aqueous sodium hydroxide solution:
hue 5 l-c (Copper)
Eluate with 1 N aqueous sodium hydroxide solution:
hue 1½ g-a (Butter-yellow)

The above hues are represented according to the representation method as described in "Color Harmony Manual" published by Container corporation of America in 1958.

EXAMPLE 9

110 Grams of the selective adsorbing particles obtained in Example 2 are packed in a column (2.5 × 35 cm). Through this column is passed 500 ml of wasted molasses of alcohol fermentation at a flowing velocity of 2 ml/minute. The said column is washed with water and thereafter elution is performed with 500 ml of 1 N aqueous sodium hydroxide solution to obtain eluate containing purified caramel dyestuff ($OD_{420m\mu}$ : 7.10).

EXAMPLE 10

110 Grams of the selective adsorbing particles obtained in Example 3 are packed in a column (2.5 × 35 cm). Through this column is passed 400 ml of supernatant ($OD_{420m\mu}$ : 22.0) derived by centrifugation (5000 r.p.m.) of waste molasses of alcohol fermentation at a flowing velocity of 2 ml/minute. The said column is then washed with water and thereafter eluted with 400 ml of 0.1 N aqueous sodium hydroxide solution to obtain eluate containing purified caramel dyestuff ($OD_{420m\mu}$ : 10.4).

EXAMPLE 11

110 Grams of the selective adsorbing particles obtained in Example 4 are packed in a column (2.5 × 35 cm). Through this column is passed an aqueous solution wherein 25 g of fish meat extract (produced by Nihon Suisan Co.) is dissolved in 75 ml of water at a flowing velocity of 10 ml/minute and then washed with 100 ml of water. The effluent and the used washing water are combined to obtain 200 ml of a treated aqueous solution of fish meat extract. The treated aqueous solution of fish meat extract contains 12.5% (W/V) of fish meat extract and reduced greatly in bad odor as compared with the aqueous solution of fish meat extract of the same concentration before passing through the column. Furthermore, the treated aqueous solution of fish meat extract is decolored to about half of the coloration of the untreated solution of the same concentration.

The thus prepared aqueous solution of fish meat extract is spray dried at the rate of 15 ml/minute under the conditions of charging air temperature of 150° to 160°C, vent air temperature of 80° to 90°C and 400 r.p.m., whereby 13 g of powders reduced in bad odor and coloration and extremely suitable for cooking is obtained.

EXAMPLE 12

80 Grams of the selective adsorbing particles obtained in Example 5 are packed in a column (12.0 × 43 cm). Through this column is passed 100 ml of 5-fold diluted solution of fish meat extract (produced by Hotei canning Co.) at a flowing velocity of 10 ml/minute and then the column is washed with 100 ml of water. The effluent and the used washing water are combined to obtain 200 ml of treated aqueous solution of fish meat extract.

The treated aqueous solution of fish meat extract obtained is slightly reduced in bad odor as compared with 10-fold dilution of the same extract. Absorbance of the treated aqueous solution of fish meat extract at 420 m$\mu$ is 3.24, while that of 10-fold dilution of the same extract is 4.92. This shows that the treated aqueous solution of meat extract is reduced also in coloration. On the other hand, it is estimated that the treated aqueous solution of fish meat extract is slightly reduced in amount of amino acids.

EXAMPLE 13

Into an Erlenmeyer flask of 2 liter capacity is charged 500 ml of a medium containing 5% corn starch, 2% maltdextrin, 4% soya flour, 1.4% of yeast powder (Panmate: trade name; Toyo Jozo Co.) and 0.1% calcium chloride. After sterilization at 120°C for 20 minutes, *Bacillus subtilis* B-516 (FERM-P No. 1485, deposited at Institute of Fermentation Research, Japan) is inoculated to said medium and shaking culture is performed at 30°C for 24 hours under aeration. The culture broth is transferred into a jar fermenter of 30 liter capacity containing 20 liter of medium having the same composition as mentioned above. Cultivation is carried out at 30°C for 64 hours under aeration of 20 liter/minute and stirring at 350 r.p.m. After the cultivation is completed, the culture broth is filtered to obtain 18 liter of culture broth filtrate. Fifty ml of this protease culture broth ($OD_{420m\mu}$ =0.680; protease activity: 6000 $[PU]^{\gamma}_{Cas.\ Fr.\ B}\ ^{Tyr.}$) is passed through a column (1 × 30 cm) packed with 10 g of the selective adsorbing particles obtained in Example 6 at a flowing velocity of 1 ml/minute. When OD and protease activity of the solution which has passed through the column are measured, the following result is obtained:

$OD_{420m\mu}$ =0.068; protease activity:
4900 $[PU]^{\gamma}_{Cas.\ Fr.\ B}\ ^{Tyr.}$ This result shows that the degree of decoloration is 90% and enzyme recovery percentage 81.7%.

EXAMPLE 14

Simulated kanamycin culture broth is prepared by adding 80 mg of kanamycin sulfate to 160 ml of a glucose bouillon medium, which s sterilized under heating at 120°C for 15 minutes and cooled. The culture broth is then passed through a column of 1.5 cm in diameter packed with 30 g of the selective adsorbing particles obtained in Example 2 at a flowing velocity of 0.5 ml/minute. The column is then washed with water and further eluted with 0.01 N HCl-methanol (1 : 1). Respective active fractions are combined to give the result that 74.4 mg (recovery percentage: 91%) of kanamycin sulfate is obtained in very high purity and yield with 98% decoloration degree and 98% purity.

EXAMPLE 15

Three kg of polyacrylonitrile fiber (Kashimiron: trade name; Asahi Kasei Kogyo Co.) is dissolved in 45 liter of dimethylformamide. Into this solution are homogeneously dispersed 9 kg of activated charcoal (Carborafin: trade name; Takeda Chemical Industries Co.). The resulting dispersion is added dropwise by the use of an atomizer cup of 5 mm in diameter into 500 liter of a 0.01% aqueous sodium lauryl benzenesulfonate solution. After the mixture is stirred for a while, the activated charcoal coated with Kashimiron is separated by filtration, followed by washing with water to obtain 45 kg of water containing selective adsorbing particles with sizes from 500 to 2000 microns. The water containing selective adsorbing particles obtained are then packed in a column (16 × 230 cm) and the column is washed sufficiently by treating the column with an aqueous sodium hydroxide solution, water, hydrochloric acid and water, in this order. On the other hand, 320 liter of waste liquor of yeast fermentation (pH 5.4) is adjusted with conc. HCl to pH 3.7, centrifugation by centrifugation to remove solid components. The resulting solution is passed through an ion-exchange resin column (16 × 125 cm) packed with 25 liter of Amberlite IR-120 B (produced by Rohm & Haas) to obtain purified waste liquor of yeast fermentation. The thus prepared purified solution ($OD_{420m\mu}$ =15.75) is charged into a column packed with the aforesaid water containing selective adsorbing particles at a flowing velocity of 30 liter/hour. After the total amount of the solution is charged into the column, the column is washed with water and further eluted with 0.1 N aqueous sodium hydroxide solution at a flowing velocity of 15 liter/hour. The dark brown colored eluate is fractionally recovered in each 5 liter fraction up to the fraction No. 14. Four fractions of these fractions are combined, respectively, (except the two fractions No. 13 and 14 combined) into combined fractions A, B, C and D (total $OD_{420m\mu}$ =3.858 × 10$^6$). The total fractions are concentrated under reduced pressure at about 45°C to obtain about 1.91 liter of purified caramel dyestuff solution (recovery percentage: 76.6%). The above 14 fractions and the combined fractions A, B, C, and D have the properties as shown in Table 1.

Table 1

| Property<br>Fraction No. | pH | $OD_{420m}$ | Combined fraction | pH | $OD_{420m}$ | Amount of concentrate |
|---|---|---|---|---|---|---|
| 1 | 3.6 | 17.6 | | | | |
| 2 | 3.6 | 26.6 | | | | |
| 3 | 3.7 | 34.5 | A | 3.7 | 35.9 | 0.5 l |
| 4 | 3.85 | 45.5 | | | | |
| 5 | 4.0 | 54.0 | | | | |

Table 1-continued

| Property Fraction No. | pH | $OD_{420m\mu}$ | Combined fraction | pH | $OD_{420m\mu}$ | Amount of concentrate |
|---|---|---|---|---|---|---|
| 6 | 4.2 | 55.0 | | | | |
| 7 | 4.3 | 72.0 | B | 4.2 | 66.5 | 0.58 l |
| 8 | 4.5 | 70.0 | | | | |
| 9 | 4.85 | 70.0 | | | | |
| 10 | 5.1 | 65.0 | | | | |
| 11 | 5.5 | 65.0 | C | 5.1 | 68.5 | 0.58 l |
| 12 | 6.4 | 65.3 | | | | |
| 13 | 8.8 | 69.5 | | | | |
| 14 | 12.8 | 49.0 | D | 10.5 | 44.0 | 0.25 l |

EXAMPLE 16

180 Liter of waste liquor of yeast fermentation (pH 5.4) is adjusted with conc. HCl to pH 4.1, followed by centrifugation to remove solid components. The solution obtained is passed through an ion-exchange column (16 × 100 cm) packed with 20 liter of Amberlite-120 B to obtain purified solution of yeast fermentation waste liquor. Then, this solution ($OD_{420m\mu}$ =16.7) is charged into a column (16 × 100 cm) packed with 20 liter of the same water containing selective adsorbing particles as used in Example 15 under the condition of 8 liter/hour. After the total amount of the solution is charged, the column is washed with water and then eluted with 0.5 N aqueous ammonia under the condition of 4 liter/hour to obtain dark brown colored eluate in fractions of each 2 liter. The fractions No. 1 to 8 are combined (A fraction:pH 8.0, $OD_{420m\mu}$ =145, Amount:16 liter) and the fractions No. 9 to 11 are combined (B fraction: pH 10.7, $OD_{420m\mu}$ =72, Amount:6 liter). Each combined fraction is concentrated at 45°C under reduced pressure to obtain 0.8 liter (recovery percentage: 77.2%) of purified caramel dyestuff solution from A fraction and 70 ml (recovery percentage:14.4%) of purified caramel dyestuff solution from B fraction.

EXAMPLE 17

In this Example, adsorption capacities of the selective adsorbing particles obtained in Examples 1 to 6 are compared with those of several Controls, namely untreated activated charcoal (Kyoryoku Shirasagi:-Takeda Chemical Industries Co.; Control 1), commercially available Adoster B 1-L (trade name: Ados Kasei Co.; Control 2), activated charcoal granules (Institute of Industrial Technology, Japan; Control 3) and commercially available large activated charcoal granules (Takeda Chemical Industries Co.; Control 4). The amount of each sample used corresponds to 1 g of activated charcoal content. As substrate, 0.01% and 0.02% aqueous Methylene Blue (M.W.=374) solution are used. Into these aqueous solutions are added, respectively, the above selective adsorbing particles and activated charcoal granules and, after mixing, the respective mixtures are left to stand. Filtrations are performed after standing for 24 hours and 48 hours, respectively. Absorbances of the filtrates at 595 mµ are measured by spectrophotometer to determine adsorption abilities for Methylene Blue.

The result as shown in Table 2 indicates that the selective adsorbing particles obtained in Examples 1 to 6 are substantially the same in adsorption capacity as the untreated activated charcoal Control 1 and that they have adsorption capacities by far superior to those of the commercially available treated activated charcoals of Controls 2 to 4.

Table 2

| Methylene Blue concentration (substrate*) | | 0.01% | | 0.02% | |
|---|---|---|---|---|---|
| | | Absorbance | Adsorption degree** | Absorbance | Adsorption degree** |
| 24 hours standing | Control 1 | 0 | 100 | 0 | 100 |
| | Example 1 | 0.550 | 89 | 0.630 | 94 |
| | Example 2 | 0.635 | 87 | 1.350 | 86 |
| | Example 3 | 1.050 | 79 | 1.625 | 84 |
| | Example 4 | 1.510 | 70 | 4.120 | 59 |
| | Example 5 | 1.075 | 78 | 2.140 | 79 |
| | Example 6 | 0.472 | 91 | 1.240 | 88 |
| | Control 2 | 2.210 | 56 | 4.480 | 55 |
| | Control 3 | 2.950 | 41 | 5.620 | 44 |
| | Control 4 | 3.550 | 29 | 5.250 | 47 |
| 48 hours standing | Control 1 | 0 | 100 | 0 | 100 |
| | Example 1 | 0.096 | 98 | 0.040 | 99.5 |
| | Example 2 | 0.153 | 97 | 0.256 | 97 |
| | Example 3 | 0.203 | 96 | 0.340 | 97 |
| | Example 4 | 0.193 | 96 | 1.645 | 84 |
| | Example 5 | 0.254 | 95 | 0.621 | 94 |
| | Example 6 | 0.129 | 97 | 0.239 | 98 |
| | Control 2 | 0.480 | 90 | 1.800 | 82 |
| | Control 3 | 0.984 | 80 | 2.825 | 72 |
| | Control 4 | 1.065 | 79 | 2.400 | 76 |

*Absorbance of substrate: 0.01% aqueous solution: 5.000
0.02% aqueous solution:10.000

**Adsorption degree = $\dfrac{\text{Absorbance of substrate} - \text{Absorbance of filtrate}}{\text{Absorbance of substrate} - \text{Absorbance of filtrate of Control 1}} \times 100$

EXAMPLE 18

Adsorption capacities for caramel of the selective adsorbing particles obtained in Examples 1 to 3 and Examples 5 to 6 are measured according to the following method. Each selective absorbing particle (in amount corresponding to 1 g of activated charcoal content) is added to 100 ml of aqueous caramel solutions (three different kinds having absorbance at 420 m$\mu$ of 1.080, 2.160 and 4.320, respectively), and the mixture is left to stand for 24 hours and 48 hours, respectively, and subjected to filtration. Absorbances of the filtrates at 420 m$\mu$ are measured and adsorption degrees are determined therefrom according to the calculation method as mentioned above. Similar tests are also conducted for the same controls 1 to 4 as used in Example 17. The result is set forth in Table 3.

Table 3

| | | Caramel concentration (OD$_{420}$ m$\mu$) | | | | | |
|---|---|---|---|---|---|---|---|
| | | 1.080 | | 2.160 | | 4.320 | |
| | | Absorbance | Adsorption degree | Absorbance | Adsorption degree | Absorbance | Adsorption degree |
| | Control 1 | 0.585 | 100 | 0.855 | 100 | 1.570 | 100 |
| 24 hours standing | Example 1 | 0.610 | 93 | 0.925 | 95 | 1.675 | 96 |
| | Example 2 | 0.650 | 85 | 1.000 | 89 | 1.980 | 85 |
| | Example 3 | 0.599 | 95 | 0.986 | 90 | 1.680 | 96 |
| | Example 5 | 0.625 | 90 | 1.017 | 88 | 1.750 | 93 |
| | Example 6 | 0.602 | 95 | 0.885 | 98 | 1.665 | 97 |
| 24 hours standing | Control 2 | 0.705 | 74 | 1.375 | 60 | 2.650 | 61 |
| | Control 3 | 0.670 | 81 | 1.350 | 62 | 2.260 | 75 |
| | Control 4 | 1.026 | 11 | 1.900 | 20 | 3.700 | 23 |
| | Control 1 | 0.375 | 100 | 0.635 | 100 | 1.390 | 100 |
| | Example 1 | 0.451 | 89 | 0.750 | 92 | 1.400 | 100 |
| | Example 2 | 0.575 | 72 | 0.900 | 83 | 1.610 | 93 |
| 48 hours standing | Example 3 | 0.448 | 90 | 0.750 | 92 | 1.410 | 99 |
| | Example 5 | 0.530 | 78 | 0.867 | 85 | 1.600 | 93 |
| | Example 6 | 0.508 | 81 | 0.825 | 88 | 1.460 | 98 |
| | Control 2 | 0.640 | 62 | 1.245 | 60 | 2.500 | 62 |
| | Control 3 | 0.538 | 77 | 1.020 | 75 | 1.955 | 81 |
| | Control 4 | 0.990 | 13 | 1.893 | 18 | 3.650 | 23 |

As apparently seen from the result shown in Table 3, the selective adsorbing particles obtained in Examples 1 to 3 and Examples 5 to 6 are substantially the same in adsorption capacity as the untreated activated charcoal of Control 1 and they have adsorption capacities by far superior to those of the commercially available treated activated charcoals of Controls 2 to 4.

EXAMPLE 19

Selective adsorbing effects of the selective adsorbing particles are measured to determine adsorptive and non-adsorptive organic compounds. The following organic compounds of which adsorption degree for untreated activated charcoal is substantially 100% are used as test samples.

| Samples | Molecular weight |
|---|---|
| A: Methylene Blue | 374 |
| B: Tuberactinomycin N | 798 |
| C: Polymyxin | 1280 |
| D: Insulin | 5700 |
| E: Egg white lysozyme | 14000 |
| F: $\alpha$-Chymotrypsin | 24500 |
| G: Semialkali protease | 30000 |
| H: Pepsin | 35000 |
| I: Egg white alubumin | 45000 |
| J: Serum alubumin | 67000 |
| K: $\gamma$-Globulin | 156000 |

Measurements are carried out by packing activated charcoal particles of each Example in a column of 1 cm in diameter and flowing out aqueous solutions of the above samples (A through K) dissolved in 10 ml of water at the velocity of 0.5 ml/minute, respectively, followed by thorough washing with water. Then, the column is eluted and the eluate is collected with a fraction collector, 5 ml per each fraction. In Samples B and D through K, absorbances of each fraction at 280 m$\mu$ is measured and multipled by the liquid amount. In Sample A, absorbance at 595 m$\mu$ is measured. In Sample C, polymyxin is detected by bioassay. The sum of these values is compared with the absorbance of the sample (280 m$\mu$) to determine the elution degree, from which adsorption degree is calculated. The result is shown in Table 4.

Table 4

| Sample (concentration) | Adsorption degree (%) | | | | | |
|---|---|---|---|---|---|---|
| | Example 1 | Example 2 | Example 3 | Example 4 | Example 5 | Example 6 |
| Sample A(5mg/ml) | 100 | 100 | 100 | 100 | 100 | 100 |
| " B (10 " ) | 100 | 100 | 100 | 100 | 100 | 100 |
| " C(2.5 " ) | 100 | 100 | 100 | 100 | 100 | 100 |
| " D (10 " ) | 100 | 100 | 100 | 100 | 100 | 100 |
| " E (10 " ) | 100 | 98 | 95 | 97 | 100 | 100 |
| " F (10 " ) | 98 | 95 | 81 | 92 | 91 | 75 |
| " G (10 " ) | 92 | 90 | 72 | 81 | 20 | 0 |
| " H (10 " ) | 70 | 55 | 60 | 60 | 0 | 0 |
| " I (10 " ) | 4 | 0 | 10 | 0 | 0 | 0 |
| " J (10 " ) | 0 | 0 | 0 | 0 | 0 | 0 |

Table 4-continued

| Sample (concentration) | Adsorption degree (%) | | | | | |
|---|---|---|---|---|---|---|
| | Example 1 | Example 2 | Example 3 | Example 4 | Example 5 | Example 6 |
| " K (10 ") | 0 | 0 | 0 | 0 | 0 | 0 |

From the above Table, it is seen that the activated charcoal particles obtained in Examples 1 to 4 have selective adsorbing effects in the range of the molecular weight between H and I and those obtained in Examples 5 to 6 in the range of the molecular weight between F and G or H.

What is claimed is:

1. A selective adsorbing particle, having an outer diameter from 100 to 5000 microns, consisting of activated charcoal powders and a polymer matrix, said polymer matrix being made of a polymer selected from the group consisting of ethyl cellulose, cellulose acetate, cellulose acetate phthalate, nitro cellulose, hydroxypropylmethyl cellulose phthalate, polyvinyl chloride, polyvinyl formal, polyvinyl butyral, vinyl chloride-vinyl acetate copolymer, vinyl acetate-vinyl propionate copolymer, polyacrylonitrile, polymethacrylonitrile, polydimethylamino ethyl methacrylate, polystyrene, and a mixture thereof, and having a structure that consists of an outer permeable barrier layer of from about 0.5 to 5 microns in thickness having a plurality of micropores from 10 to 50 angstroms in diameter and of a macroporous polymer gel matrix continuous to said barrier layer, said activated charcoal powders being dispersed inner side of said polymer gel matrix in an amount from 20 to 80% by weight based on the dry weight of said particle, and said particle having a void volume equal to at least 25% of the total volume thereof.

2. A selective adsorbing particle according to claim 1, wherein the amount of the activated charcoal is from about 40 to 80% by weight based on the dry weight of said particle.

3. A selective adsorbing particle according to claim 1, wherein said polymer is selected from the group consisting of cellulose acetate, polyvinyl butyral, polyvinyl formal, polyacrylonitrile, vinyl chloride-vinyl acetate copolymer, vinyl chloride-vinyl propionate copolymer and a mixture thereof.

4. A process for producing a selective adsorbing particle as claimed in claim 1, comprising the steps of:
 a. first dissolving a polymer selected from the group consisting of ethyl cellulose, cellulose acetate, cellulose acetate phthalate, nitro cellulose, hydroxypropylmethyl cellulose phthalate, polyvinyl chloride, polyvinyl formal, polyvinyl butyral, vinyl chloride-vinyl acetate copolymer, vinyl acetate-vinyl propionate copolymer, polyacrylonitrile, polymethacrylonitrile, polydimethylamino ethyl methacrylate, polystyrene, and a mixture thereof in a hydrophilic solvent;
 b. then dispersing activated charcoal powders into the thus-prepared polymer solution; and
 c. adding dropwise the dispersion in a coagulating medium, thereby solidifying the polymer matrix by removal of the solvent through coagulation.

5. A process according to claim 4, wherein the hydrophilic solvent is selected from the group consisting of N,N-dimethylformamide, dimethylsulfoxide, N,N-dimethylacetamide, acetone, methyl ethyl ketone, methanol, ethanol and isopropanol.

6. A process according to claim 4, wherein a coagulating medium is water or an aqueous solution.

7. A process according to claim 4, wherein the polymer concentration in the hydrophilic solvent is from about 5 to about 30%.

* * * * *